US012598397B2

(12) United States Patent　　　(10) Patent No.: US 12,598,397 B2
Yin et al.　　　　　　　　　　　　(45) Date of Patent:　　　Apr. 7, 2026

(54) DIRT DETECTION METHOD AND DEVICE FOR CAMERA COVER

(71) Applicant: SHANGHAI INTEGRATED CIRCUIT MANUFACTURING INNOVATION CENTER CO., LTD., Shanghai (CN)

(72) Inventors: Rui Yin, Shanghai (CN); Min Xu, Shanghai (CN); Wei Zhang, Shanghai (CN); Jian Jin, Shanghai (CN)

(73) Assignee: SHANGHAI INTEGRATED CIRCUIT MANUFACTURING INNOVATION CENTER CO., LTD., Shanghai (CN)

( * ) Notice: Subject to any disclaimer, the term of this patent is extended or adjusted under 35 U.S.C. 154(b) by 812 days.

(21) Appl. No.: 17/925,903

(22) PCT Filed: Nov. 11, 2021

(86) PCT No.: PCT/CN2021/130124
§ 371 (c)(1),
(2) Date: Nov. 17, 2022

(87) PCT Pub. No.: WO2023/005058
PCT Pub. Date: Feb. 2, 2023

(65) Prior Publication Data
US 2024/0230862 A1　　Jul. 11, 2024

(30) Foreign Application Priority Data
Jul. 30, 2021　(CN) .......................... 202110872582.2

(51) Int. Cl.
*H04N 23/81*　　(2023.01)
*G01S 7/497*　　(2006.01)
(Continued)

(52) U.S. Cl.
CPC .......... *H04N 23/811* (2023.01); *G01S 17/894* (2020.01); *G06T 7/0002* (2013.01); *G01S 2007/4975* (2013.01)

(58) Field of Classification Search
CPC ................. H04N 23/811; G01S 17/894; G01S 2007/4975; G06T 7/0002
See application file for complete search history.

(56) References Cited

U.S. PATENT DOCUMENTS

| | | | | |
|---|---|---|---|---|
| 2010/0283888 A1* | 11/2010 | Mirbach | .............. | H04N 5/2226 |
| | | | | 348/E5.045 |
| 2021/0223374 A1* | 7/2021 | Kudla | ..................... | G01S 17/42 |
| 2022/0126792 A1* | 4/2022 | Totsuka | ................ | G01S 17/931 |

FOREIGN PATENT DOCUMENTS

CN　　　　112672017 A　*　4/2021

* cited by examiner

*Primary Examiner* — ONeal R Mistry
*Assistant Examiner* — Nhut Huy Pham
(74) *Attorney, Agent, or Firm* — Ziegler IP Law Group, LLC.

(57)　　　　　　ABSTRACT

Embodiments of the present invention provide a dual-modality bionic vision sensor. A first-type current-mode active pixel sensor (APS) circuit can simulate excitatory rod cells to perceive light intensity gradient information in a target light signal, thereby improving a dynamic arrange of an image sensed by a bionic vision sensor and its shooting speed. In addition, a first-type control switch is introduced for each of non-target first-type photosensitive devices to control the obtained light intensity gradient information, and to adjust the dynamic arrange of the image sensed by the bionic vision sensor, thereby adjusting the shooting speed and realizing a reconfigurable effect. A voltage-mode APS can simulate cone cells to output a target voltage signal representing light intensity information in the target light signal, and to perceive the light intensity information in the
(Continued)

Obtain a first normal-frame image and a first detection-frame image of a target object by using a camera with a reference cover, obtain a first normal-frame grayscale value of each of all pixels in the first normal-frame image, obtain a first detection-frame grayscale value of each of all pixels in the first detection-frame image, and obtain a background grayscale image ratio according to the first detection-frame grayscale value and the first normal-frame grayscale value; and obtain a second normal-frame image and a second detection-frame image of the target object by using a camera with a to-be-detected cover, obtain a second normal-frame grayscale value of each of all pixels in the second normal-frame image, obtain a second detection-frame grayscale value of each of all pixels in the second normal-frame image, and obtain a detection grayscale image ratio according to the second detection-frame image grayscale value and the second normal-frame image grayscale value ⌐ S1

Perform ratio operation on the detection grayscale image ratio and the background grayscale image ratio, to obtain a grayscale ratio, and determine whether a pixel is dirty according to a comparison result between the grayscale ratio and a dirt threshold ⌐ S2

Count dirty pixels in the second normal-frame image or the second detection-frame image, to obtain a quantity of the dirty pixels, and determine whether the to-be-detected cover is in a dirty state according to the quantity of the dirty pixels ⌐ S3 target light signal. In this way, the obtained light intensity information represented by the target voltage signal has a higher precision, thereby ensuring the image quality.

10 Claims, 3 Drawing Sheets

(51) Int. Cl.
    *G01S 17/894*      (2020.01)
    *G06T 7/00*       (2017.01)

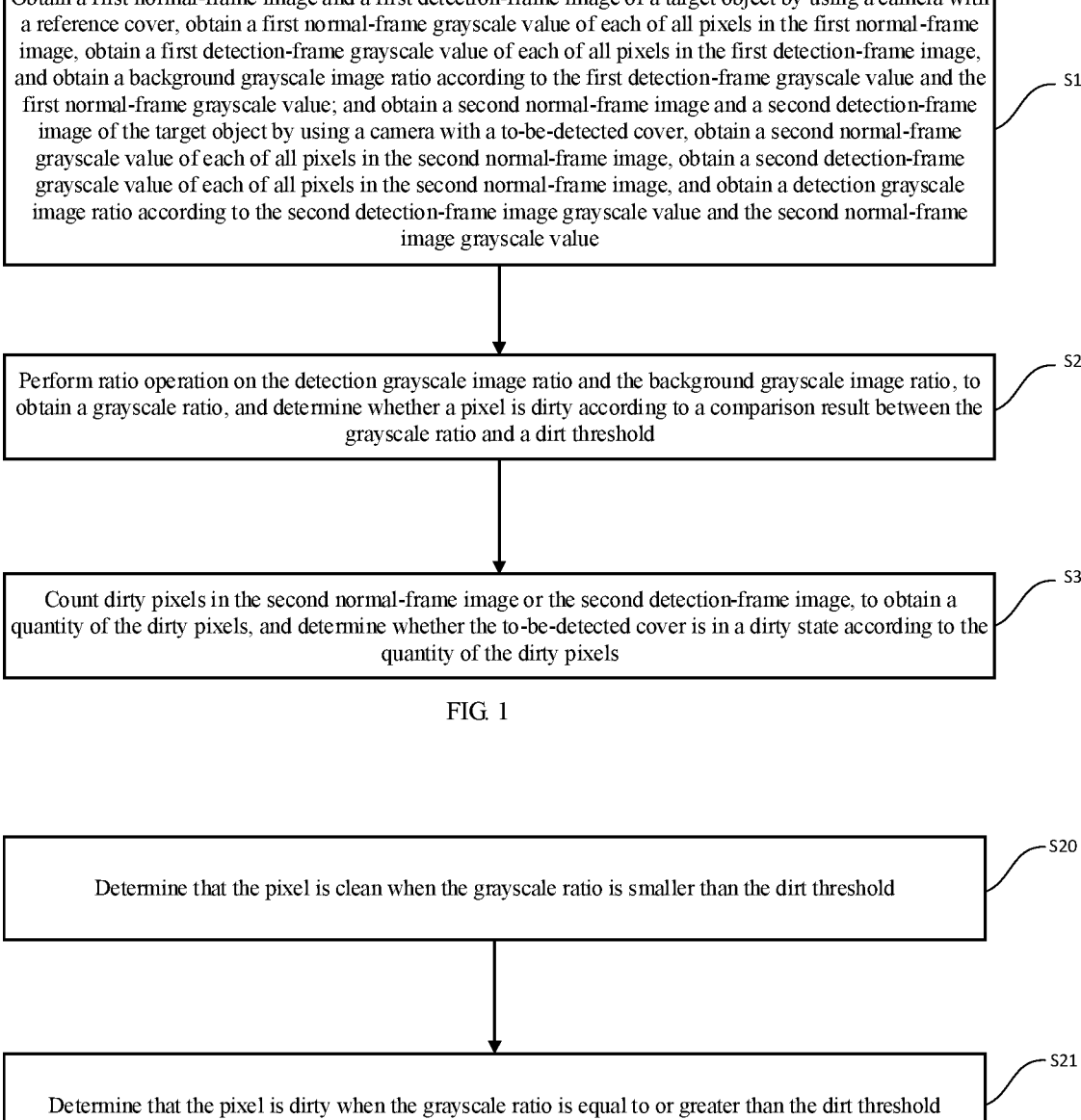

Obtain a first normal-frame image and a first detection-frame image of a target object by using a camera with a reference cover, obtain a first normal-frame grayscale value of each of all pixels in the first normal-frame image, obtain a first detection-frame grayscale value of each of all pixels in the first detection-frame image, and obtain a background grayscale image ratio according to the first detection-frame grayscale value and the first normal-frame grayscale value; and obtain a second normal-frame image and a second detection-frame image of the target object by using a camera with a to-be-detected cover, obtain a second normal-frame grayscale value of each of all pixels in the second normal-frame image, obtain a second detection-frame grayscale value of each of all pixels in the second normal-frame image, and obtain a detection grayscale image ratio according to the second detection-frame image grayscale value and the second normal-frame image grayscale value          S1

Perform ratio operation on the detection grayscale image ratio and the background grayscale image ratio, to obtain a grayscale ratio, and determine whether a pixel is dirty according to a comparison result between the grayscale ratio and a dirt threshold          S2

Count dirty pixels in the second normal-frame image or the second detection-frame image, to obtain a quantity of the dirty pixels, and determine whether the to-be-detected cover is in a dirty state according to the quantity of the dirty pixels          S3

FIG. 1

Determine that the pixel is clean when the grayscale ratio is smaller than the dirt threshold          S20

Determine that the pixel is dirty when the grayscale ratio is equal to or greater than the dirt threshold          S21

FIG. 2

DIRT DETECTION METHOD AND DEVICE FOR CAMERA COVER

CROSS-REFERENCE TO RELATED APPLICATIONS

The present application claims the benefit and priority of Chinese Patent Application No. 2021108725822, filed on Friday, Jul. 30, 2021, the disclosure of which is incorporated by reference herein in its entirety as part of the present application.

FIELD OF TECHNOLOGY

The present invention relates to the field of cameras, and in particular to a dirt detection method and device for a camera cover.

BACKGROUND

A time-of-fight (ToF) camera is a new-generation product for distance detection and 3D imaging technologies. Specifically, the ToF camera continuously sends light pulses to a target, and then uses the sensor to receive the light returned from the object, and finally obtains a target distance by detecting the flight (round-trip) time of the light pulse. During the operation of the ToF camera, dust gradually accumulates on the surface of it's cover, which causes inaccurate ranging. Therefore, it is necessary to detect whether there is dust on the surface.

The invention patent No. CN 112672017 A discloses a detection structure member, a ToF device, and a lens dirt detection method. The detection structure member is disposed in a light-emitting direction of a ToF module to detect how dirty the lens is on a surface of the transparent cover of the ToF module. The detection structure member includes two sub-members each having a reflective surface. The reflective surfaces of the two sub-members are arranged co-axially and sequentially and at least have partial regions that do not overlap. The lens dirt detection method in the invention includes: obtaining a pre-configured standard grayscale image; controlling a ToF sensor member towards a detection light signal transmitted by a detection structure member, and receive a reflected light signal, and obtaining a measured grayscale image of the detection structure member based on the reflected light signal; and comparing the standard grayscale image with the measured grayscale image, and determining whether a lens on a transparent cover is dirty according to a comparison result. In the invention, whether the lens on the transparent cover is dirty is determined by just comparing the obtained standard grayscale image and measured grayscale image. Such a determination method is simple, with a low precision.

Therefore, to resolve the problem in the related art, it is necessary to provide a dirt detection method and device for a camera cover.

SUMMARY

An objective of the present invention is to provide a dirt detection method and device for a camera cover, to resolve the problem of a low precision of determining the dirty level of a cover and lens.

To achieve the foregoing objective, the dirt detection method for a camera cover in the present invention includes:

S1: obtaining a first normal-frame image and a first detection-frame image of a target object by using a camera with a reference cover, obtaining a first normal-frame grayscale value of each of all pixels in the first normal-frame image, obtaining a first detection-frame grayscale value of each of all pixels in the first detection-frame image, and obtaining a background grayscale image ratio according to the first detection-frame grayscale value and the first normal-frame grayscale value; and obtaining a second normal-frame image and a second detection-frame image of the target object by using a camera with a to-be-detected cover, obtaining a second normal-frame grayscale value of each of all pixels in the second normal-frame image, obtaining a second detection-frame grayscale value of each of all pixels in the second detection-frame image, and obtaining a detection grayscale image ratio according to the second detection-frame grayscale value and the second normal-frame grayscale value;

S2: performing ratio operation on the detection grayscale image ratio and the background grayscale image ratio to obtain a grayscale ratio, and determining whether a pixel is dirty according to a comparison result between the grayscale ratio and a dirt threshold; and S3: counting dirty pixels in the second normal-frame image or the second detection-frame image to obtain a quantity of the dirty pixels, and determining whether the to-be-detected cover is in a dirty state according to the quantity of the dirty pixels.

The dirt detection method for a camera cover in the present invention has the following beneficial effects:

In the present invention, the first normal-frame grayscale value, a first detection-frame grayscale value, a second normal-frame grayscale value, and a second detection-frame grayscale value are obtained respectively according to a first normal-frame image, a first detection-frame image, a second normal-frame image, and a second detection-frame image. Then, the grayscale ratios are calculated to obtain a detection grayscale image ratio and a background grayscale image ratio. At last, a ratio of the detection grayscale image ratio to the background grayscale image ratio is obtained as a grayscale ratio. It is determined whether a pixel on the to-be-detected cover is dirty according to a comparison result between the grayscale ratio and a dirt threshold, and determined whether the to-be-detected cover is in a dirty state according to a quantity of the dirty pixels. Taking four different images as measurement samples, the grayscale values of all pixels in the four images are detected, to provide more detection samples, thereby greatly improving the reliability of detection results and dirty state determination results. First, the background grayscale image ratio of a camera with a reference cover is calculated as a reference for the dirt detection on the camera cover. Then, a detection grayscale image ratio of the to-be-detected cover is calculated. Finally, the grayscale ratio is calculated. It is determined whether the camera cover is in a dirty state according to a quantity of the dirty pixels. The determining steps are rigorous and orderly, which avoids the incorrect determination of the dirty state of the camera cover caused by individual abnormal dirty pixels, and improves the accuracy of the detection result of the dirty state of the cover.

Preferably, in step S1, obtaining a first normal-frame image and a first detection-frame image of a target object by using a camera with a reference cover includes:

setting fixed periods, where each of the fixed periods includes first exposure time and second exposure time, and the first exposure time and the second exposure time are set alternatively;

transmitting, by the camera with a reference cover, a normal-frame laser pulse to the target object to form the first normal-frame image, where exposure time of the normal-frame laser pulse is the first exposure time; and transmitting, by the camera with a reference cover, a detection-frame laser pulse to the target object to form the first detection-frame image, where exposure time of the detection-frame laser pulse is the second exposure time; and the normal-frame laser pulse is wider than the detection-frame laser pulse, and the first exposure time is equal to the second exposure time. This step has the beneficial effect as follows: the camera with the reference cover transmits a normal-frame laser pulse and a detection-frame laser pulse to the target object to obtain the first normal-frame image and the first detection-frame image respectively, thereby increasing the sample quantity of the detected pixels.

Further, preferably, in step S1, obtaining a second normal-frame image and a second detection-frame image of a target object by using a camera with a to-be-detected cover includes:

transmitting, by the camera with a to-be-detected cover, a normal-frame laser pulse to the target object to form the second normal-frame image, where exposure time of the normal-frame laser pulse is the first exposure time; and transmitting, by the camera with a to-be-detected cover, a detection-frame laser pulse to the target object to form the second detection-frame image, where exposure time of the detection-frame laser pulse is the second exposure time This step has the beneficial effect as follows: the camera with the to-be-detected cover transmits a normal-frame laser pulse and a detection-frame laser pulse to the target object to obtain the second normal-frame image and the second detection-frame image respectively, thereby improving the sample quantity of the detected pixels. The normal-frame laser pulse is wider than the detection-frame laser pulse, such that the normal-frame image obtained by transmitting the normal-frame laser pulse and the detection-frame image obtained by transmitting the detection-frame laser pulse have different pixel grayscale values, making the subsequent calculation more precise. The first exposure time is equal to the second exposure time to ensure that the detection results of the first normal-frame image and the first detection-frame image as well as the second normal-frame image and the second detection-frame image are not affected by the exposure time, thereby further improving the determination accuracy and reliability of the dirty state of the cover.

Preferably, in step S2, determining whether a pixel is dirty according to a comparison result between the grayscale ratio and a dirt threshold includes:

determining that the pixel is clean when the grayscale ratio is smaller than the dirt threshold; and determining that the pixel is dirty when the grayscale ratio is equal to or greater than the dirt threshold.

Further, preferably, in step S3, determining whether the to-be-detected cover is in a dirty state according to the quantity of the dirty pixels includes:

setting a mild-dirt threshold, a moderate-dirt threshold, and a severe-dirt threshold, where the moderate-dirt threshold is greater than the mild-dirt threshold, and the severe-dirt threshold is greater than the moderate-dirt threshold; and determining the dirty state of the to-be-detected cover according to comparison results between the quantity of the dirty pixels and the mild-dirt threshold, the moderate-dirt threshold as well as the severe-dirt threshold. This step has the beneficial effect as follows: The set mild-dirt threshold, moderate-dirt threshold, and severe-dirt threshold provide a standard for determining the dirty state of the cover, improving the determination precision of the dirty state of the cover.

Preferably, the determining the dirty state of the to-be-detected cover according to comparison results between the quantity of the dirty pixels and the mild-dirt threshold, the moderate-dirt threshold as well as the severe-dirt threshold includes:

determining that the to-be-detected cover is clean when the quantity of the dirty pixels is smaller than the mild-dirt threshold;

determining that the to-be-detected cover is mildly dirty when the quantity of the dirty pixels is equal to or greater than the mild-dirt threshold and smaller than the moderate-dirt threshold;

determining the to-be-detected cover is moderately dirty when the quantity of the dirty pixels is equal to or greater than the moderate-dirt threshold and smaller than the severe-dirt threshold; and determining that the to-be-detected cover is severely dirty when the quantity of the dirty pixels is equal to or greater than the severe-dirt threshold.

Preferably, in step S1, obtaining a background grayscale image ratio according to the first detection-frame grayscale value and the first normal-frame grayscale value includes:

obtaining a normal-frame grayscale value of any one of first pixels in the first normal-frame image, and calculating a detection-frame grayscale value of a second pixel in the first detection-frame image, where a position of the first pixel in the first normal-frame image is the same as that of the second pixel in the first detection-frame image; and performing ratio operation on the detection-frame grayscale value of the second pixel and the normal-frame grayscale value of the first pixel to obtain the background grayscale image ratio.

Further, preferably, in step S1, obtaining a detection grayscale image ratio according to the second detection-frame grayscale value and the second normal-frame grayscale value includes:

obtaining a normal-frame grayscale value of a third pixel in the second normal-frame image, and calculating a detection-frame grayscale value of a fourth pixel in the second detection-frame image, where positions of the third pixel in the second normal-frame image and of the fourth pixel in the second detection-frame image are both the same as that of the first pixel in the first normal-frame image; and performing ratio operation on the detection-frame grayscale value of the fourth pixel and the normal-frame grayscale value of the third pixel to obtain a detection grayscale image ratio. This step has the beneficial effect as follows: After any one of first pixels is selected from the first normal-frame image, its position is determined. In addition, a second pixel, a third pixel, and a fourth pixel in a same pixel position in the first normal-frame image are selected respectively from the first detection-frame image, the second normal-frame image, and a second detection-frame image to ensure the accuracy of calculating the pixel grayscale values and the grayscale ratios.

The present disclosure further provides a detection device, including:

a laser device disposed at an inner side of a camera cover and configured to transmit a laser pulse to a target object;

an imaging sensor disposed at an inner side of the camera cover and configured to receive the laser pulse, form a first normal-frame image, a first detection-frame image, a second normal-frame image, and a second detection-frame image, obtain a first normal-frame grayscale value according to the first normal-frame image, obtain a first detection-frame grayscale value according to the first detection-frame image, obtain a second normal-frame grayscale value according to the second normal-frame image, and obtain a second detection-frame grayscale value according to the second detection-frame image;

a processing module connected to the imaging sensor and configured to perform ratio operation on the first normal-frame grayscale value and the first detection-frame grayscale value to obtain a background grayscale image ratio, perform ratio operation on the second normal-frame grayscale value and the second detection-frame grayscale value to obtain a detection grayscale image ratio, and perform ratio operation on the detection grayscale image ratio and the background grayscale image ratio to obtain a grayscale ratio, where the processing module is further configured to determine whether a pixel in the second normal-frame image or the second detection-frame image is dirty according to a comparison result between the grayscale ratio and a dirt threshold, and determine whether a to-be-detected cover is in a dirty state according to the dirty pixel.

The detection device of the present invention has the beneficial effect as follows:

The imaging sensor obtains the first normal-frame image, the first detection-frame image, the second normal-frame image, and the second detection-frame image, as well as the first normal-frame grayscale value, the first detection-frame grayscale value, the second normal-frame grayscale value, and the second detection-frame grayscale value. Grayscale values of all pixels in the four images are detected so as to provide more detection samples, thereby greatly improving the reliability of the determination results of the dirty state and the detection result. The processing module calculates the background grayscale image ratio, the detection grayscale image ratio and the grayscale ratio rigorously and orderly, improving the precision of the detection results of the dirty state of the cover.

Preferably, the processing module determines that the pixel is dirty when the grayscale ratio is equal to or greater than the dirt threshold.

The processing module is further configured to count dirty pixels to obtain a quantity of the dirty pixels, and perform steps of determining the dirty state of the to-be-detected cover:

determining that the to-be-detected cover is clean when the quantity of the dirty pixels is smaller than the mild-dirt threshold;

determining that the to-be-detected cover is mildly dirty when the quantity of the dirty pixels is equal to or greater than the mild-dirt threshold and smaller than the moderate-dirt threshold;

determining the to-be-detected cover is moderately dirty when the quantity of the dirty pixels is equal to or greater than the moderate-dirt threshold and smaller than the severe-dirt threshold; and determining that the to-be-detected cover is severely dirty when the quantity of the dirty pixels is equal to or greater than the severe-dirt threshold.

BRIEF DESCRIPTION OF THE DRAWINGS

FIG. 1 is a flowchart of a dirt detection method for a camera cover according to an embodiment of the present invention;

FIG. 2 is a flowchart of determining a dirty state of a pixel according to an embodiment of the present invention;

DETAILED DESCRIPTION OF THE EMBODIMENTS

Figure 3:
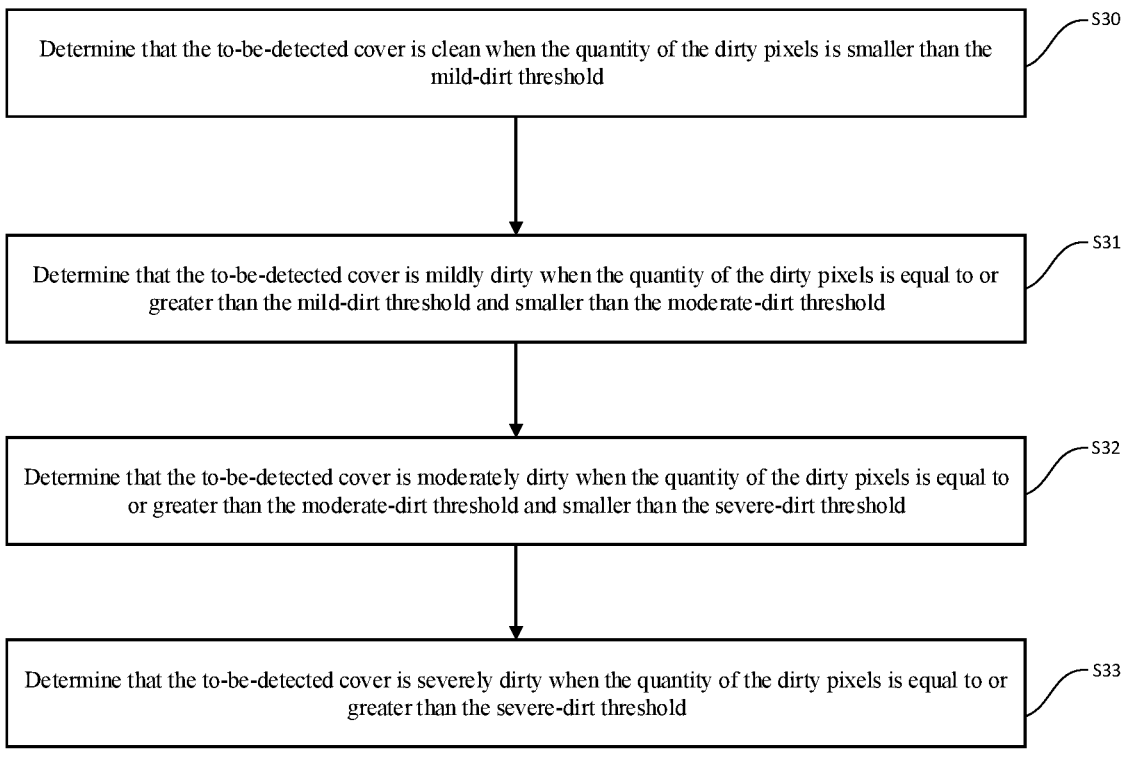
FIG. 3 is a flowchart of determining a dirty state of a to-be-detected cover according to an embodiment of the present invention.

In order to make objectives, technical solutions, and advantages of the present invention clearer, the technical solutions in the embodiments of the present invention are described clearly and completely. Apparently, the described embodiments are only some rather than all of the embodiments of the present invention. On the basis of the embodiments of the present disclosure, all other embodiments acquired by those of ordinary skill in the art without making creative efforts shall fall within the scope of protection of the present disclosure. Unless otherwise mentioned, all technical and scientific terms used herein have the same meaning as commonly understood by one of ordinary skill in the art to which the present invention belong. Terms such as "include" used herein means that the element or item appearing before the term encompass the elements or items listed after the term and their equivalents, without excluding other elements or items.

To resolve the technical problem in the related art, the present invention provides a dirt detection method for a camera cover. FIG. 1 is a flowchart of a dirt detection method for a camera cover according to an embodiment of the present invention. The dirt detection method for the camera cover includes steps:

S1: Obtain a first normal-frame image and a first detection-frame image of a target object by using a camera with a reference cover, calculate a first normal-frame grayscale value IR_ref1 of each of all pixels in the first normal-frame image, calculate a first detection-frame grayscale value IR_ref2 of each of all pixels in the first detection-frame image, and obtain a background grayscale image ratio ratio_ref according to the first detection-frame grayscale value IR_ref2 and the first normal-frame grayscale value IR_ref1, where no dust is on the surface of the reference cover, which is used as a reference for the dirt detection on the camera cover.

Specifically, the background grayscale image ratio is a ratio of the first detection-frame grayscale value to the first normal-frame grayscale value, that is, ratio_ref=IR_ref2/IR_ref1.

Obtain a second normal-frame image and a second detection-frame image of the target object by using a camera with a to-be-detected cover, calculate a second normal-frame grayscale value IR_test1 of all pixels in the second normal-frame image, calculate a second detection-frame grayscale value IR_test2 of all pixels in the second detection-frame image, and obtain a detection grayscale image ratio ratio_test according to the second detection-frame grayscale value IR_test2 and the second normal-frame grayscale value IR_test1.

Specifically, the detection grayscale image ratio is a ratio of the second detection-frame grayscale value to the second normal-frame grayscale value, that is, ratio_test=IR_test2/IR_test1.

S2: Perform ratio operation on the detection grayscale image ratio ratio_ref and the background grayscale image ratio ratio_test, to obtain a grayscale ratio k, that is, k=ratio_test/ratio_ref, and determine whether a pixel is dirty according to a comparison result between the grayscale ratio k and a dirt threshold thres.

S3: Count dirty pixels in the second normal-frame image or the second detection-frame image, to obtain a quantity A_all of the dirty pixels, and determine whether the to-be-detected cover is in a dirty state according to the quantity A_all of the dirty pixels.

The dirt detection method for a camera cover in the present invention has the following beneficial effects:

(1) In the present invention, the first normal-frame grayscale value, a first detection-frame grayscale value, a second normal-frame grayscale value, and a second detection-frame grayscale value are obtained respectively according to a first normal-frame image, a first detection-frame image, a second normal-frame image, and a second detection-frame image. Then, grayscale ratios are calculated to obtain a detection grayscale image ratio and a background grayscale image ratio. At last, a ratio of the detection grayscale image ratio to the background grayscale image ratio is obtained as a grayscale ratio. It is determined whether a pixel on the to-be-detected cover is dirty according to a comparison result between the grayscale ratio and a dirt threshold, and determined whether the to-be-detected cover is in a dirty state according to a quantity of the dirty pixels. Taking four different images as measurement samples, the grayscale values of all pixels in the four images are detected, to provide more detection samples, thereby greatly improving the reliability of detection results and dirty state determination results.

(2) First, the background grayscale image ratio of a camera with a reference cover is calculated as a reference for the dirt detection on the camera cover. Then, the detection grayscale image ratio of the camera with the to-be-detected cover is calculated. Finally, the grayscale ratio is calculated. It is determined that a pixel is dirty according to a comparison result between the grayscale ratio and the dirt threshold. It is determined that the to-be-detected cover is in a dirty state according to a quantity A_all of dirty pixels. The determination steps are rigorous and orderly.

(3) It is determined first whether a pixel is dirty, and then it is determined whether the cover is dirty according to a quantity of the dirty pixels, which avoids the incorrect determination of the dirty state of the camera cover caused by individual abnormal dirty pixels, and improves the accuracy of the detection result of the dirty state of the cover.

In a preferable implementation of the present invention, before step S1, the method further includes steps of locating the camera cover and the target object:

Farthest measurable distances of a normal frame and of a detection frame are obtained. The target object or the camera cover is moved such that a distance between the target object and the camera is a preset distance Dis. The preset distance Dis is greater than the farthest measurable distance of the detection frame and smaller than the farthest measurable distance of the normal frame. This step has the advantages as follows: When the distance between the target object and the camera is the preset distance Dis, after the camera with a clean cover transmits a normal-frame laser pulse to the target object, the camera can receive a normal-frame laser reflected by the target object. After the camera with a clean cover transmits a detection-frame laser pulse to the target object, the detection frame cannot receive a reflected detection-frame laser, and therefore the camera with a clean cover cannot receive a detection-frame grayscale value. Only when the cover is dirty, the camera can receive a detection-frame laser reflected by the target object, that is, a camera with a dirty cover can receive a detection-frame grayscale value, increasing the reliability and accuracy of the result of detecting whether the camera cover is dirty.

A step of obtaining the farthest measurable distance of the normal frame includes: multiplying a pulse width tp1 of the normal frame with a light speed c to obtain a first distance c×tp1, and dividing the first distance by 2 to obtain the farthest measurable distance (c×tp1)/2 of the normal frame.

A step of obtaining the farthest measurable distance of the detection frame includes: multiplying a pulse width tp2 of the detection frame with a light speed c to obtain a second distance c×tp2, and dividing the second distance by 2 to obtain the farthest measurable distance (c×tp2)/2 of the detection frame. The pulse width tp1 of the normal frame is greater than that tp2 of the detection frame. According to the foregoing formula, a value range of a preset distance Dis may be: (c×tp2)/2<Dis<(c×tp1)/2.

In a preferable implementation of the present invention, in step S1, the step of obtaining a first normal-frame image and a first detection-frame image of a target object by using a camera with a reference cover includes:

setting fixed periods, where each of the fixed periods includes first exposure time and second exposure time, and the first exposure time and the second exposure time are set alternatively;

transmitting, by the camera with a reference cover, a normal-frame laser pulse to the target object, to form the first normal-frame image in the camera, where exposure time of the normal-frame laser pulse is the first exposure time; and transmitting, by the camera with a reference cover, a detection-frame laser pulse to the target object, to form the first detection-frame image in the camera, where exposure time of the detection-frame laser pulse is the second exposure time. This step has the advantage as follows: the camera with the reference cover transmits a normal-frame laser pulse and a detection-frame laser pulse to the target object, to obtain the first normal-frame image and the first detection-frame image respectively, thereby improving the sample quantity of the detected pixels.

In a preferable implementation of the present invention, in step S1, the obtaining a second normal-frame image and a second detection-frame image of a target object by using a camera with a to-be-detected cover includes:

transmitting, by the camera with a to-be-detected cover, a normal-frame laser pulse to the target object, to form the second normal-frame image in the camera, where exposure time of the normal-frame laser pulse is the first exposure time; and transmitting, by the camera with a to-be-detected cover, a
    detection-frame laser pulse to the target object, to form
    the second detection-frame image in the camera, where
    exposure time of the detection-frame laser pulse is the
    second exposure time.

The pulse width tp1 of the normal-frame laser pulse is greater than that tp2 of the detection-frame laser pulse, and the first exposure time is equal to the second exposure time. This step has the advantage as follows: the camera with a to-be-detected cover transmits a normal-frame laser pulse and a detection-frame laser pulse to the target object, to obtain the second normal-frame image and the second detection-frame image respectively, thereby improving the sample quantity of the detected pixels. The normal-frame laser pulse is wider than the detection-frame laser pulse, such that the normal-frame image obtained by transmitting the normal-frame laser pulse and the detection-frame image obtained by transmitting the detection-frame laser pulse have different pixel grayscale values, making the subsequent calculation more precise. The first exposure time is equal to the second exposure time, to ensure that the detection results of the first normal-frame image and the first detection-frame image as well as the second normal-frame image and the second detection-frame image are not affected by the exposure time, thereby improving the determination accuracy and reliability of the dirty state of the cover.

In the present invention, based on step S1, to improve the accuracy of detecting and calculating the grayscale value, and improve the accuracy and reliability of the detection result of the dirty state of the camera cover, the average values of the background grayscale image ratios and of the detection grayscale image ratios may be also calculated as follows:

After the camera with a reference cover obtains a first normal-frame grayscale value and a first detection-frame grayscale value of a pixel within a fixed period, ratio operation is performed on the first normal-frame grayscale value and the first detection-frame grayscale value, to obtain the background grayscale image ratio. A sum of background grayscale image ratios of the pixel within a plurality of successive fixed periods is divided by a quantity of the fixed periods, to obtain the average value of the background grayscale image ratios. Then, the background grayscale image ratio is replaced by the average value.

After the camera with a to-be-detected cover obtains a second normal-frame grayscale value and a second detection-frame grayscale value of a pixel within a fixed period, ratio operation is performed on the second normal-frame grayscale value and the second detection-frame grayscale value, to obtain the detection grayscale image ratio. A sum of detection grayscale image ratios of the pixel within a plurality of successive fixed periods is divided by a quantity of the fixed periods, to obtain the average value of the detection grayscale image ratios. Then, the detection grayscale image ratio is replaced by the average value.

Then, the grayscale ratio is a ratio of the average value of the detection grayscale image ratio to that of the background grayscale image ratio. It is determined that the pixel is dirty when the grayscale ratio is equal to or greater than a dirt threshold. It is determined that the pixel is clean when the grayscale ratio is smaller than the dirt threshold. The background grayscale image ratio and the detection grayscale image ratio within each of the fixed periods are calculated, and the average values of the background grayscale image ratios and of the detection grayscale image ratios within a plurality of successive fixed periods are calculated, thereby avoiding incorrect grayscale values detected within a single period, and decreasing the calculation errors, to further improve the accuracy and reliability of determining the dirty state of the camera cover in the present invention.

In some implementations, a quantity of the fixed periods may be set to 3. If background grayscale image ratios within three successive fixed periods are ratio_ref 1, ratio_ref 2, and ratio_ref 3 respectively, the average value ratio_ref_average of the background grayscale image ratios is calculated by using the following formula:

$$\text{ratio\_ref\_average}_{average} = (\text{ratio\_ref } 1 + \text{ratio\_ref } 2 + \text{ratio\_ref } 3)/3.$$

If detection grayscale image ratios within three successive fixed periods are ratio_test 1, ratio_test 2, and ratio_test 3 respectively, the average value ratio_test_average of the detection grayscale image ratios is calculated by using the following formula:

$$\text{ratio\_test\_average} = (\text{ratio\_test } 1 + \text{ratio\_test } 2 + \text{ratio\_test } 3)/3.$$

If the grayscale ratio is equal to a ratio of the average value of the detection grayscale image ratio and that of the background grayscale image ratio, the grayscale ratio k is calculated by using the formula:

$$k = \text{ratio\_test\_average}/\text{ratio\_ref\_average}$$

In a preferable implementation of the present invention, in step S1, the obtaining a background grayscale image ratio according to the first detection-frame grayscale value and the first normal-frame grayscale value includes:

calculating a normal-frame grayscale value IR_ref1 of
    any one of first pixels in the first normal-frame image,
    and calculating a detection-frame grayscale value
    IR_ref2 of a second pixel in the first detection-frame
    image, where a position of the first pixel in the first
    normal-frame image is the same as that of the second
    pixel in the first detection-frame image; and
performing ratio operation on the detection-frame gray-
    scale value IR_ref2 of a second pixel and a normal-
    frame grayscale value IR_ref1 of the first pixel, to
    obtain a background grayscale image ratio ratio_ref,
    that is, ratio_ref=IR_ref2/IR_ref1.

In a preferable implementation of the present invention, in step S1, the obtaining a detection grayscale image ratio according to the second detection-frame grayscale value and the second normal-frame grayscale value includes:

calculating a normal-frame grayscale value IR_test1 of a
    third pixel in the second normal-frame image, and
    calculating a detection-frame grayscale value IR_test2
    of a fourth pixel in the second detection-frame image,
    where positions of the third pixel in the second normal-
    frame image and of the fourth pixel in the second
    detection-frame image are both the same as that of the
    first pixel in the first normal-frame image; and
performing ratio operation on the detection-frame gray-
    scale value IR_test2 of the fourth pixel and the normal-
    frame grayscale value IR_test1 of the third pixel, to
    obtain a detection grayscale image ratio ratio_test, that
    is, ratio_test=IR_test2/IR_test1. This step has the
    advantage as follows: After any one of first pixels is
    selected from the first normal-frame image, its position
    is determined. In addition, a second pixel, a third pixel,
    and a fourth pixel in a same pixel position in the first
    normal-frame image are selected respectively from the
    first detection-frame image, the second normal-frame
    image, and a second detection-frame image, to ensure
    the accuracy of calculating the pixel grayscale values
    and the grayscale ratios.

In a preferable implementation of the present invention, FIG. 2 is a flowchart of determining a dirty state of a pixel according to an embodiment of the present invention. In step S2, the step of determining whether a pixel is dirty according to a comparison result between the grayscale ratio k and a dirt threshold thres includes:

S20: Determine that the pixel is clean when the grayscale ratio k is smaller than the dirt threshold thres, that is, k<thres.

S21: Determine that the pixel is dirty when the grayscale ratio k is equal to or greater than the dirt threshold thres, that is, k≥thres.

In some implementations, the processing module may record a pixel of which a grayscale ratio is greater than the dirt threshold, and is configured to count the total quantity of the pixels, to determine the dirty state of the cover.

In a preferable implementation of the present invention, in step S3, the step of determining whether the to-be-detected cover is in a dirty state according to the quantity A_all of the dirty pixels includes:

setting a mild-dirt threshold thres_1, a moderate-dirt threshold thres_2, and a severe-dirt threshold thres_3, where the moderate-dirt threshold thres_2 is greater than the mild-dirt threshold thres_1, and the severe-dirt threshold thres_3 is greater than the moderate-dirt threshold thres_2, that is, thres_1<thres_2<thres_3.

It may be noted that when the normal-frame laser pulse or the detection-frame laser pulse is transmitted to the target object, and the camera cover is dirty, the quantity of the pixels in the image is not affected. Therefore, quantities of the pixels in the first normal-frame image, the second normal-frame image, the first detection-frame image, and the second detection-frame image are same. However, when the cover is dirty, because some lasers reflected by the dirty overlap with those reflected by the target object in the camera, a grayscale value of a dirty pixel is greater than that of the clean pixel. Therefore, the total quantity of the dirty pixels in the image is affected when the cover is dirty. If the to-be-detected camera cover is dirty, quantities of dirty pixels in the second normal-frame image and the second detection-frame image are same.

It is determined that the dirty state of the to-be-detected cover according to comparison results between the quantity A_all of the dirty pixels and the mild-dirt threshold thres_1, the moderate-dirt threshold thres_2 as well as the severe-dirt threshold thres_3. These steps have the beneficial effect as follows: The set mild-dirt threshold, moderate-dirt threshold, and severe-dirt threshold provide a standard for determining the dirty state of the cover, improving the determination precision of the dirty state of the cover.

In a preferable implementation of the present invention, FIG. 3 is a flowchart of determining a dirty state of a to-be-detected cover according to an embodiment of the present invention. The step of determining the dirty state of the to-be-detected cover according to comparison results between the quantity of the dirty pixels and the mild-dirt threshold, the moderate-dirt threshold as well as the severe-dirt threshold specifically includes:

S30: Determine that the to-be-detected cover is clean when the quantity A_all of the dirty pixels is smaller than the mild-dirt threshold thres_1, that is, A_all<thres_1;

S31: Determine that the to-be-detected cover is mildly dirty when the quantity A_all of the dirty pixels is equal to or greater than the mild-dirt threshold thres_1 and smaller than the moderate-dirt threshold thres_2, that is, thres_1≤A_all<thres_2;

S32: Determine that the to-be-detected cover is moderately dirty when the quantity A_all of the dirty pixels is equal to or greater than the moderate-dirt threshold thres_2 and smaller than the severe-dirt threshold thres_3, that is, thres_2≤A_all<thres_3; and S33: Determine that the to-be-detected cover is severely dirty when the quantity A_all of the dirty pixels is equal to or greater than the severe-dirt threshold thres_3, that is, A_all≥thres_3.

In some embodiments of the present invention, the mild-dirt threshold thres_1 may be set to 10% of the total quantity Pixels_all of pixels in the first normal-frame image, that is, thres_1=10%×Pixels_all.

The moderate-dirt threshold thres_2 may be set to 50% of the total quantity Pixels_all of pixels in the first normal-frame image, that is, thres_2=50%×Pixels_all.

The severe-dirt threshold thres_3 may be set to 80% of the total quantity Pixels_all of pixels in the first normal-frame image, that is, thres_3=80%×Pixels_all.

In some implementations, if a percentage of the dirty pixels in the first normal-frame image obtained by using a camera with a reference cover to all pixels therein is smaller than 10%, a percentage of dirty pixels in the first detection-frame image to all pixels therein is smaller than 10%, and quantities of the dirty pixels in the first normal-frame image and the first detection-frame image are smaller than the mild-dirt threshold thres_1, the reference cover is clean.

Figure 4:
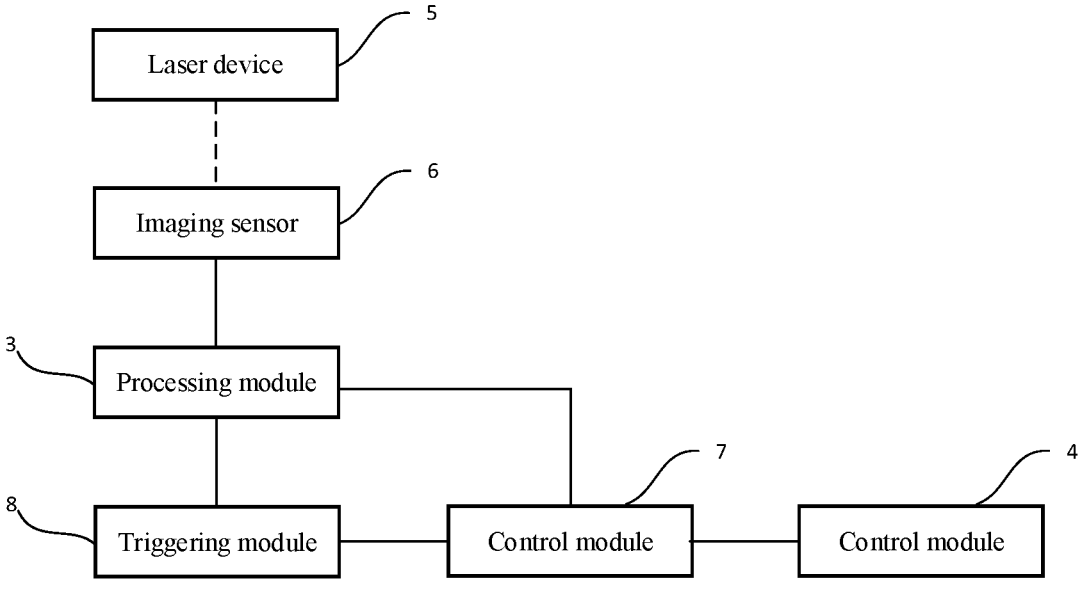
FIG. 4 is a schematic structural diagram of a detection device according to an embodiment of the present invention.

The present invention further provides a detection device. FIG. 4 is a schematic structural diagram of a detection device according to an embodiment of the present invention. With reference to FIG. 4, the detection device includes:

a laser device 5 disposed at an inner side of a camera cover 2, and configured to transmit a laser pulse to a target object 1, such that an imaging sensor 6 obtains a first normal-frame image, a first detection-frame image, a second normal-frame image, and a second detection-frame image. The laser device 5 alternately transmits a normal-frame laser pulse and a detection-frame laser pulse within a fixed period. Specifically, the laser device 5 of the camera with a reference cover transmits a normal-frame laser pulse to the target object 1 to obtain the first normal-frame image, and transmits a detection-frame laser pulse, to obtain the first detection-frame image. The laser device 5 transmits a normal-frame laser pulse to the target object 1, to obtain the second normal-frame image, and transmits a detection-frame laser pulse to obtain the second detection-frame image.

An imaging sensor 6 is disposed at an inner side of the camera cover 2, and is configured to obtain a first normal-frame grayscale value according to a first normal-frame image, obtain a first detection-frame grayscale value according to a first detection-frame image, obtain a second normal-frame grayscale value according to the second normal-frame image, and obtain a second detection-frame grayscale value according to the second detection-frame image.

A processing module 3 is connected to the imaging sensor 6 and configured to perform ratio operation on the first normal-frame grayscale value and the first detection-frame grayscale value to obtain a background grayscale image ratio, perform ratio operation on the second normal-frame grayscale value and the second detection-frame grayscale value to obtain a detection grayscale image ratio, and perform ratio operation on the detection grayscale image ratio and the background grayscale image ratio to obtain a grayscale ratio.

The processing module 3 is further configured to determine whether a pixel in the second normal-frame image or the second detection-frame image is dirty according to a comparison result between the grayscale ratio and a dirt threshold, and determine whether a to-be-detected cover is in a dirty state according to a quantity of the dirty pixels.

The detection device of the present invention has the advantages as follows:

The imaging sensor 6 obtains the first normal-frame image, the first detection-frame image, the second normal-frame image, and the second detection-frame image, as well as the first normal-frame grayscale value, the first detection-frame grayscale value, the second normal-frame grayscale value, and the second detection-frame grayscale value. Grayscale values of all pixels in the four images are detected, to provide more detection samples, thereby greatly improving the reliability of the determination results of the dirty state and the detection result. The processing module 3 calculates the background grayscale image ratio, the detection grayscale image ratio, and the grayscale ratio. It is determined that a pixel is dirty according to a comparison result between the grayscale ratio and the dirt threshold. It is determined that the to-be-detected cover is in a dirty state according to the quantity of the dirty pixels. The determination steps are rigorous and orderly, and improves the accuracy of the detection results of the dirty state of the cover.

Figure 5:
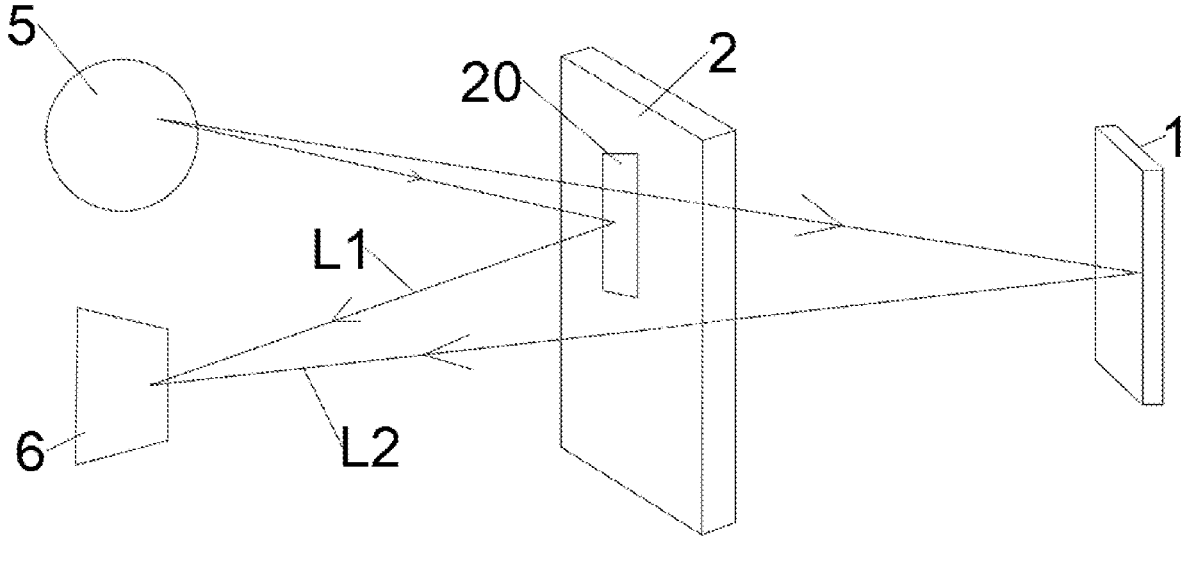
FIG. 5 is a schematic diagram of positions of the camera cover and a laser device according to an embodiment of the present invention.

In a specific implementation of the present invention, FIG. 5 is a schematic diagram of positions of the camera cover and a laser device according to an embodiment of the present invention. A position relationship among the camera cover 2, the target object 1, the laser device 5, and the imaging sensor 6 are shown in FIG. 5 The left side of the camera cover 2 is the inner side of the camera cover 2, and the imaging sensor 6 and the laser device 5 are both located at an inner side of the camera cover 2. The right side of the camera cover 2 is the outer side of the camera cover 2, and the target object 1 is located outside the camera cover 2. The principle of detecting the dirty pixel is as follows:

With reference to FIG. 5, when there is a dirty region 20 is on the camera cover 2, and the laser device 5 transmits a laser pulse, a light ray passing the dirty region 20 is reflected by the dirty region 20 through a light ray transmission path L1. The imaging sensor 6 receives the laser reflected by the dirty region 20, thereby forming the dirty pixel.

When the laser pulse transmitted by the laser device 5 does not pass through the dirty region 20, but the camera cover 2 directly, and is transmitted to the target object 1, the lase pulse is reflected by the target object 1 and then passes back through the camera cover 2, and finally is transmitted to the imaging sensor 6, where the light ray transmission path is L2. After receiving the laser reflected by the target object 1, the imaging sensor 6 forms a normal dirty pixel.

When the camera cover 2 is clean, because a distance between the target object and the camera is out of a measurement range of the camera, after the laser device 5 transmits a detection-frame laser pulse, the imaging sensor almost cannot receive the laser reflected by the target object, the background grayscale image ratio is quite small, and detection grayscale image ratio is unchanged.

When the camera cover 2 is dirty, after the laser device 5 transmits the detection-frame laser pulse, the imaging sensor 6 receives the laser reflected by the dirty region 20. The laser reflected by the dirty region 20 and the laser reflected by the target object partially overlap, thereby increasing the pixel grayscale value of the image received by the imaging sensor 6. Therefore, the detection grayscale image ratio is increased, that is, the detection grayscale image ratio of the dirty cover is greater than the detection grayscale image ratio of a clean one, to determine whether the pixel is dirty. After the dirty pixel is determined, the quantity of the dirty pixels may be counted subsequently, and the dirty state of the cover is further determined according to the quantity of the dirty pixels.

In a preferable implementation of the present invention, with reference to FIG. 4, the processing module 3 determines that the pixel is dirty when the grayscale ratio is equal to or greater than the dirt threshold.

The processing module 3 determines that the pixel is clean when the grayscale ratio is smaller than the dirt threshold.

The step of determining whether the to-be-detected cover is in a dirty state specifically includes the following steps:

The processing module 3 counts dirty pixels in the second normal-frame image or the second detection-frame image, to obtain a quantity of the dirty pixels.

The processing module 3 determines that the to-be-detected cover is clean when the quantity of the dirty pixels is smaller than the mild-dirt threshold.

The processing module 3 determines that the to-be-detected cover is mildly dirty when the quantity of the dirty pixels is equal to or greater than the mild-dirt threshold and smaller than the moderate-dirt threshold.

The processing module 3 determines that the to-be-detected cover is moderately dirty when the quantity of the dirty pixels is equal to or greater than the moderate-dirt threshold and smaller than the severe-dirt threshold.

The processing module 3 determines that the to-be-detected cover is severely dirty when the quantity of the dirty pixels is equal to or greater than the severe-dirt threshold.

In a preferable implementation of the present invention, with reference to FIG. 4, the detection device further includes an instruction triggering module 8 and a control module 7, and the instruction triggering module 8 is connected to the control module 7. The instruction triggering module 8 generates a boot instruction every a fixed detection duration and sends the boot instruction to the control module 7. After receiving the boot instruction, the control module 7 starts the laser device 5, the imaging sensor 6, and the processing module 3. The foregoing process has the advantage as follows: the laser device 5, the imaging sensor 6, and the processing module 3 are started regularly, to detect the dirty state of the cover regularly, thereby improving the timeliness and effectiveness of determining the state of the camera cover, and ensuring the ranging accuracy of the camera.

In a specific implementation, with reference to FIG. 4, after the detection device in the present invention detects the dirty level of the camera cover to obtain a detection result, and determines that the camera cover is dirty or clean, the device may temporarily stand by to save power. The instruction triggering module 8 generates a boot instruction every a fixed detection duration, which may be set to 5 min, that is, the instruction triggering module 8 generates a boot instruction every 5 min, and sends the boot instruction to the control module 7. In other words, after the camera operates for 5 min, and after receiving the boot instruction, the control module 7 starts the detection device, to detect the dirty state of the camera cover. In addition, when the camera is powered on, the instruction triggering module 8 also generates a boot instruction, to make the control module 7 to control the detection device to start, thereby detecting the dirty state of the camera cover when the camera is powered on, and improving the detection efficiency of the camera cover.

In a preferable implementation of the present invention, with reference to FIG. 4, the detection device further includes a warning module 4. The warning module 4 is connected to the control module 7, and the control module 7 is connected to the processing module 3. When the processing module 3 determines that the cover is dirty, the instruction triggering module 8 generates a warning instruction and sends it to the control module 7. After receiving the warning instruction, the control module 7 starts the warning module 4, to make it generates a warning signal. The foregoing process has the advantage as follows: when the cover is dirty, the warning module 4 generates the warning signal, to remind the user of cleaning the cover, to ensure the ranging accuracy of the camera.

In some specific implementations, the warning module 4 may be one or more LED warning lights. The warning module may show the dirty state of the camera cover by disposing a red LED, a yellow LED, and a green LED (not shown in the figure). The control module 7 controls the red LED, the yellow LED, and the LED green in the following steps:

When the processing module 3 determines that the camera cover is clean, the control module 7 controls all the LEDs to be in an off state.

When the processing module 3 determines that the camera cover is mildly dirty, the control module 7 controls the green LED to light up, and other LEDs to turn off.

When the processing module 3 determines that the camera cover is moderately dirty, the control module 7 controls the yellow LED to light up, and other LEDs to turn off.

When the processing module 3 determines that the camera cover is severely dirty, the control module 7 controls the red LED to light up, and other LEDs to turn off.

Although the embodiments of the present invention are described in detail, it is apparent to those skilled in the art that various modifications and changes can be made to the embodiments. However, it is to be understood that such modifications and variations are within the scope and spirit of the present invention as described in the appended claims. Furthermore, the present invention described herein is susceptible to other embodiments and may be embodied or carried out in various ways.

The invention claimed is:

1. A dirt detection method for a camera cover, comprising steps:

S1: obtaining a first normal-frame image and a first detection-frame image of a target object by using a camera with a reference cover, obtaining a first normal-frame grayscale value of each of all pixels in the first normal-frame image, obtaining a first detection-frame grayscale value of each of all pixels in the first detection-frame image, and obtaining a background grayscale image ratio according to the first detection-frame grayscale value and the first normal-frame grayscale value; and obtaining a second normal-frame image and a second detection-frame image of the target object by using a camera with a to-be-detected cover, obtaining a second normal-frame grayscale value of each of all pixels in the second normal-frame image, obtaining a second detection-frame grayscale value of each of all pixels in the second detection-frame image, and obtaining a detection grayscale image ratio according to the second detection-frame grayscale value and the second normal-frame grayscale value;

S2: performing ratio operation on the detection grayscale image ratio and the background grayscale image ratio to obtain a grayscale ratio, and determining whether a pixel is dirty according to a comparison result between the grayscale ratio and a dirt threshold; and S3: counting dirty pixels in the second normal-frame image or the second detection-frame image to obtain a quantity of the dirty pixels, and determining whether the to-be-detected cover is in a dirty state according to the quantity of the dirty pixels.

2. The dirt detection method for a camera cover according to claim 1, wherein in step S1, obtaining a first normal-frame image and a first detection-frame image of a target object by using a camera with a reference cover comprises:

setting fixed periods, wherein each of the fixed periods comprises first exposure time and second exposure time, and the first exposure time and the second exposure time are set alternatively;

transmitting, by the camera with a reference cover, a normal-frame laser pulse to the target object to form the first normal-frame image, wherein exposure time of the normal-frame laser pulse is the first exposure time; and transmitting, by the camera with a reference cover, a detection-frame laser pulse to the target object to form the first detection-frame image, wherein exposure time of the detection-frame laser pulse is the second exposure time; and the normal-frame laser pulse is wider than the detection-frame laser pulse, and the first exposure time is equal to the second exposure time.

3. The dirt detection method for a camera cover according to claim 2, wherein in step S1, obtaining a second normal-frame image and a second detection-frame image of the target object by using a camera with a to-be-detected cover comprises:

transmitting, by the camera with a to-be-detected cover, a normal-frame laser pulse to the target object to form the second normal-frame image, wherein exposure time of the normal-frame laser pulse is the first exposure time; and transmitting, by the camera with a to-be-detected cover, a detection-frame laser pulse to the target object to form the second detection-frame image, wherein exposure time of the detection-frame laser pulse is the second exposure time.

4. The dirt detection method for a camera cover according to claim 1, wherein in step S2, determining whether a pixel is dirty according to a comparison result between the grayscale ratio and a dirt threshold comprises:

determining that the pixel is clean when the grayscale ratio is smaller than the dirt threshold; and determining that the pixel is dirty when the grayscale ratio is equal to or greater than the dirt threshold.

5. The dirt detection method for a camera cover according to claim 4, wherein in step S3, determining whether the to-be-detected cover is in a dirty state according to the quantity of the dirty pixels comprises:

setting a mild-dirt threshold, a moderate-dirt threshold, and a severe-dirt threshold, wherein the moderate-dirt threshold is greater than the mild-dirt threshold, and the severe-dirt threshold is greater than the moderate-dirt threshold; and determining the dirty state of the to-be-detected cover according to comparison results between the quantity of the dirty pixels and the mild-dirt threshold, the moderate-dirt threshold as well as the severe-dirt threshold.

6. The dirt detection method for a camera cover according to claim 5, wherein the determining the dirty state of the to-be-detected cover according to comparison results between the quantity of the dirty pixels and the mild-dirt threshold, the moderate-dirt threshold as well as the severe-dirt threshold comprises:

determining that the to-be-detected cover is clean when the quantity of the dirty pixels is smaller than the mild-dirt threshold;

determining that the to-be-detected cover is mildly dirty when the quantity of the dirty pixels is equal to or greater than the mild-dirt threshold and smaller than the moderate-dirt threshold;

determining the to-be-detected cover is moderately dirty when the quantity of the dirty pixels is equal to or greater than the moderate-dirt threshold and smaller than the severe-dirt threshold; and determining that the to-be-detected cover is severely dirty when the quantity of the dirty pixels is equal to or greater than the severe-dirt threshold.

7. The dirt detection method for a camera cover according to claim 1, wherein in step S1, obtaining a background grayscale image ratio according to the first detection-frame grayscale value and the first normal-frame grayscale value comprises:

obtaining a normal-frame grayscale value of any one of first pixels in the first normal-frame image, and obtaining a detection-frame grayscale value of a second pixel in the first detection-frame image, wherein a position of the first pixel in the first normal-frame image is the same as that of the second pixel in the first detection-frame image; and performing ratio operation on the detection-frame grayscale value of the second pixel and the normal-frame grayscale value of the first pixel to obtain the background grayscale image ratio.

8. The dirt detection method for a camera cover according to claim 7, wherein in step S1, obtaining a detection grayscale image ratio according to the second detection-frame grayscale value and the second normal-frame grayscale value comprises:

obtaining a normal-frame grayscale value of a third pixel in the second normal-frame image, and obtaining a detection-frame grayscale value of a fourth pixel in the second detection-frame image, wherein positions of the third pixel in the second normal-frame image and of the fourth pixel in the second detection-frame image are both the same as that of the first pixel in the first normal-frame image; and performing ratio operation on the detection-frame grayscale value of the fourth pixel and the normal-frame grayscale value of the third pixel to obtain a detection grayscale image ratio.

9. A detection device, comprising:

a laser device disposed at an inner side of a camera cover and configured to transmit a laser pulse to a target object;

an imaging sensor disposed at an inner side of the camera cover and configured to receive the laser pulse, form a first normal-frame image, a first detection-frame image, a second normal-frame image, and a second detection-frame image, obtain a first normal-frame grayscale value according to the first normal-frame image, obtain a first detection-frame grayscale value according to the first detection-frame image, obtain a second normal-frame grayscale value according to the second normal-frame image, and obtain a second detection-frame grayscale value according to the second detection-frame image;

a processing module connected to the imaging sensor and configured to perform ratio operation on the first normal-frame grayscale value and the first detection-frame grayscale value to obtain a background grayscale image ratio, perform ratio operation on the second normal-frame grayscale value and the second detection-frame grayscale value to obtain a detection grayscale image ratio, and perform ratio operation on the detection grayscale image ratio and the background grayscale image ratio to obtain a grayscale ratio, where the processing module is further configured to determine whether a pixel in the second normal-frame image or the second detection-frame image is dirty according to a comparison result between the grayscale ratio and a dirt threshold, and determine whether a to-be-detected cover is in a dirty state according to the dirty pixel.

10. The detection device according to claim 9, wherein the processing module determines that the pixel is dirty when the grayscale ratio is equal to or greater than the dirt threshold; and the processing module is further configured to count dirty pixels to obtain a quantity of the dirty pixels, and perform steps of determining the dirty state of the to-be-detected cover:

determining that the to-be-detected cover is clean when the quantity of the dirty pixels is smaller than the mild-dirt threshold;

determining that the to-be-detected cover is mildly dirty when the quantity of the dirty pixels is equal to or greater than the mild-dirt threshold and smaller than the moderate-dirt threshold;

determining the to-be-detected cover is moderately dirty when the quantity of the dirty pixels is equal to or greater than the moderate-dirt threshold and smaller than the severe-dirt threshold; and determining that the to-be-detected cover is severely dirty when the quantity of the dirty pixels is equal to or greater than the severe-dirt threshold.

\* \* \* \* \*